United States Patent
Trionfetti

(10) Patent No.: US 9,505,104 B2
(45) Date of Patent: Nov. 29, 2016

(54) DYNAMIC BALANCING PROCESS AND DEVICE FOR A ROTATING BODY

(71) Applicant: BALANCE SYSTEMS, S.r.L., Milan (IT)

(72) Inventor: Gianni Trionfetti, Agrate Brianza (IT)

(73) Assignee: BALANCE SYSTEMS S.r.L., Milan (IT)

( * ) Notice: Subject to any disclaimer, the term of this patent is extended or adjusted under 35 U.S.C. 154(b) by 0 days.

(21) Appl. No.: 14/679,317

(22) Filed: Apr. 6, 2015

(65) Prior Publication Data
US 2015/0290772 A1 Oct. 15, 2015

(30) Foreign Application Priority Data

Apr. 9, 2014 (EP) ...................................... 14163957

(51) Int. Cl.
*F16F 15/14* (2006.01)
*B24D 5/16* (2006.01)
*G01M 1/36* (2006.01)
*F16F 15/36* (2006.01)

(52) U.S. Cl.
CPC ............. *B24D 5/165* (2013.01); *F16F 15/366* (2013.01); *G01M 1/36* (2013.01)

(58) Field of Classification Search
CPC .................................. B24D 5/165; F16F 15/36
See application file for complete search history.

(56) References Cited

U.S. PATENT DOCUMENTS

| | | | | |
|---|---|---|---|---|
| 3,371,450 A | * | 3/1968 | Board, Jr. | B24B 41/04 451/343 |
| 3,698,263 A | * | 10/1972 | Ito | F16F 15/36 451/343 |
| 3,822,514 A | * | 7/1974 | Vetter | G01M 1/36 451/343 |
| 3,827,193 A | * | 8/1974 | Liebmann | G01M 1/36 451/343 |
| 5,549,019 A | * | 8/1996 | Cattani | B24B 41/042 408/143 |
| 6,210,099 B1 | * | 4/2001 | Hugbart | F16F 15/36 415/119 |
| 2010/0065347 A1 | * | 3/2010 | Kereth | B61B 3/02 180/9.42 |
| 2014/0094091 A1 | | 4/2014 | Trionfetti | |

OTHER PUBLICATIONS

European Search Report for European Application No. 14 16 3957; two pages; completed Sep. 1, 2014.

* cited by examiner

*Primary Examiner* — Vicky Johnson
(74) *Attorney, Agent, or Firm* — Vorys, Sater, Seymour & Pease LLP

(57) ABSTRACT

Provided is a balancing device for a rotating body defining a rotation axis and including a plurality of balancing heads aligned along the rotation axis, each balancing head including, balancing masses configured to be moved at least along a movement circumference to cancel out the unbalance of the rotating body; at least one motor configured to move said balancing masses independently of each other, the balancing masses belonging to different balancing heads being reciprocally distanced along the rotation axis; and unbalance detectors including a plurality of vibration detectors configured to measure the vibrations caused by the unbalances of the rotating body.

7 Claims, 4 Drawing Sheets

DYNAMIC BALANCING PROCESS AND DEVICE FOR A ROTATING BODY

FIELD OF THE INVENTION

The present invention relates to a dynamic balancing device.

DESCRIPTION OF THE PRIOR ART

As is known, tools may have dynamic and/or rotational unbalances.

Rotational unbalances are present when the tool is not perfectly balanced with respect to its rotation axis, that is to say when its barycentre does not lie along the rotation axis.

Dynamic unbalances instead, are unbalances along cross-section planes passing through the grinding wheel axis. A plurality of normal sections may in fact be present, perpendicular to the rotation axis of the tool, presenting rotational unbalances which reciprocally compensate each other but which give rise to undesired momentums along axes perpendicular to the rotation axis of the tool.

There are therefore unbalances along two planes.

Said dynamic and/or rotational unbalances give rise to unwanted vibrations during the activation in rotation of the tool, and thus determine poor quality machining and various drawbacks.

In order to avoid such problems, whenever a grinding wheel is placed on the grinding machine, the operator balances said wheel by means of suitable devices and counter-weights.

Despite the initial balancing, as the grinding wheel becomes worn, it tends to change its barycentre and thus move it away from the rotation axis. In fact, when performing processing, the grinding wheel is subject to deformations and wear which modify its geometry, causing an unbalanced condition.

The balancing devices and processes suitable for measuring the rotational unbalance of the grinding wheel are thus suitable to continuously change the position of the barycentre of the grinding wheel, re-balancing it.

They generally comprise two reciprocally moveable masses suitable to cancel out the unbalances present, a sensor suitable to detect the unbalance of the grinding wheel and a control apparatus suitable to control the motion of the masses depending on the unbalance.

The prior art described above has several significant drawbacks.

A first drawback is due to the fact that the known balancing devices are unable to perform a dynamic balancing of a rotating body.

A second important drawback is the fact that the known devices perform the balancing through a particularly long process, since the movement of the masses is performed in a substantially random manner. In fact, the balancing process provides that once the unbalance has been detected the masses be moved to a position and the unbalance variation be measured with respect to the previous position. If the result is not as expected, namely if the grinding wheel is not correctly balanced, the process is repeated until a position of the masses is detected which is able to cancel out the unbalance of the grinding wheel.

A further drawback is therefore identifiable in that, due to the slowness of the balancing process, machine cycle times are increased.

A further defect is that, due to the wear of the grinding wheel and the need to have a constant tangential speed, the known devices are unable to perform the balancing of the grinding wheel and, as a result, the operator is forced to interrupt machining to set-up the machine.

In particular, such defect proves significant in rotating grinding wheels with a high axial extension, such as those used for machining gears.

In this situation the technical task according to the present invention is to provide a dynamic balancing device and a process for a rotating body, able to substantially overcome the drawbacks mentioned.

Within the scope of said technical task an important aim of the invention is to obtain a balancing device and process which is precisely able to dynamically balance the piece being machined.

Within the scope of said technical task, an important aim of the invention to obtain a balancing device and process which assure practically perfect and fast balancing of a rotating body.

A further important aim of the invention is therefore to devise a balancing device and process suitable to permit high quality production.

A further aim of the invention is to design a balancing device and process able to ensure an optimal static and dynamic balancing of the grinding wheel.

SUMMARY OF THE INVENTION

The present invention relates to a dynamic balancing device for a rotating body, the rotating body defining a rotation the balancing device comprising a rotating portion suitable to be integrally connected, to the rotating body, the rotating portion comprising: balancing masses suitable to be moved relative to the rotating body along a movement circumference to cancel out the unbalances of the rotating body; a plurality of motors one for each of the balancing masses suitable to move the balancing masses, a plurality of electric lines, comprising electric wires, each serving one electric motor. In particular, the invention concerns a device and a process suitable to recover the dynamic imbalances of a tool. More in particular, it relates to a grinding machine, and to be precise, to a grinding wheel so as to cancel out its unbalances.

The technical task and the specified aims are achieved by a balancing device for a rotating body the rotating body defining a rotation, the balancing device comprising a rotating portion suitable to be integrally connected, to the rotating body, the rotating portion comprising: balancing masses suitable to be moved relative to the rotating body along a movement circumference to cancel out the unbalances of the rotating body; a plurality of motors one for each of the balancing masses suitable to move the balancing masses, a plurality of electric lines, comprising electric wires, each serving one electric motor, wherein at least some electric line associated with a plurality of motors are arranged in a network, so that a reduced quantity of electric wires needs to be positioned inside the rotating portion.

BRIEF DESCRIPTION OF THE DRAWINGS

The characteristics and advantages of the invention are clearly evident from the following detailed description of a preferred embodiment thereof, with reference to the accompanying drawings, in which.

DESCRIPTION OF THE PREFERRED EMBODIMENTS

Figure 1:
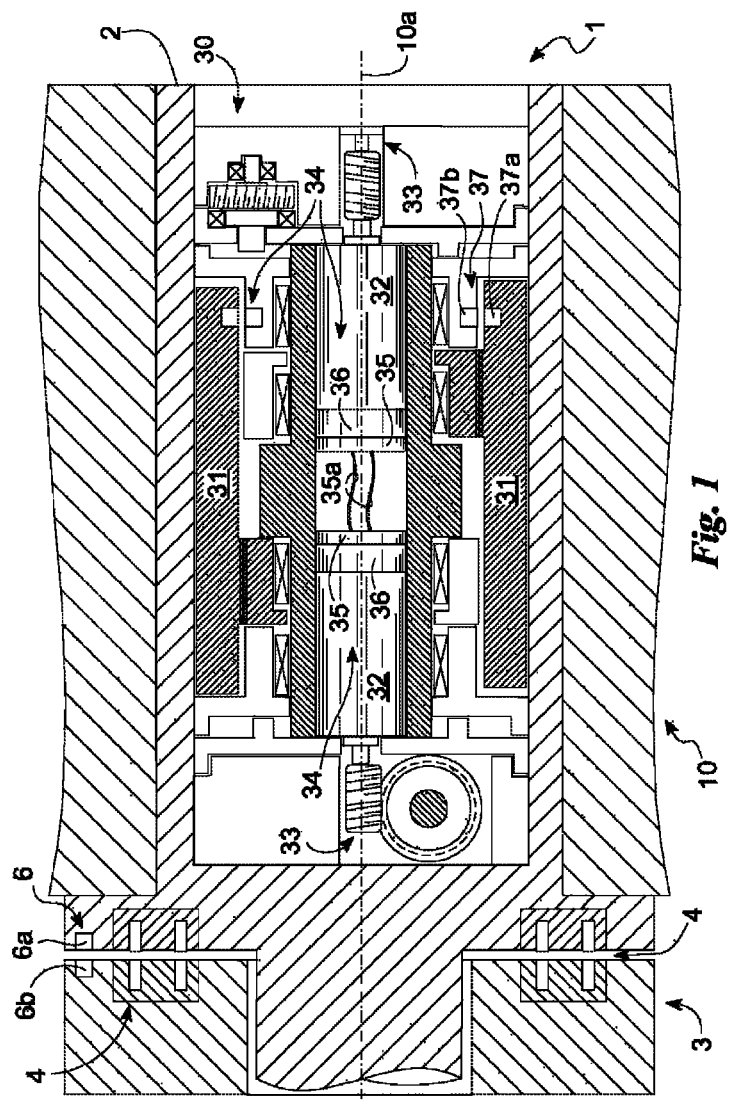
FIG. 1 shows a portion of a balancing device for a rotating body according to the invention.

With reference to the Figures referred to, a balancing device for a rotating body according to the invention is globally denoted by reference numeral 1.

It is suitable to be associated to a rotating body 10, suitable for placing in rotation around a rotation axis 10a, so as to balance at least one type of unbalance. In detail, the device 1 is suitable to be integrally connected to the rotating body 10 and, specifically, to be housed inside the rotating body 10, along the axis thereof, so as to rotate around the axis 10a integrally therewith.

Preferably, the balancing device 1 is suitable to be used in a tool, more preferably a grinding machine and more specifically, to be associated to a grinding wheel constituting the rotating body 10, so as to measure and cancel out its unbalance during rotation.

Figure 3:
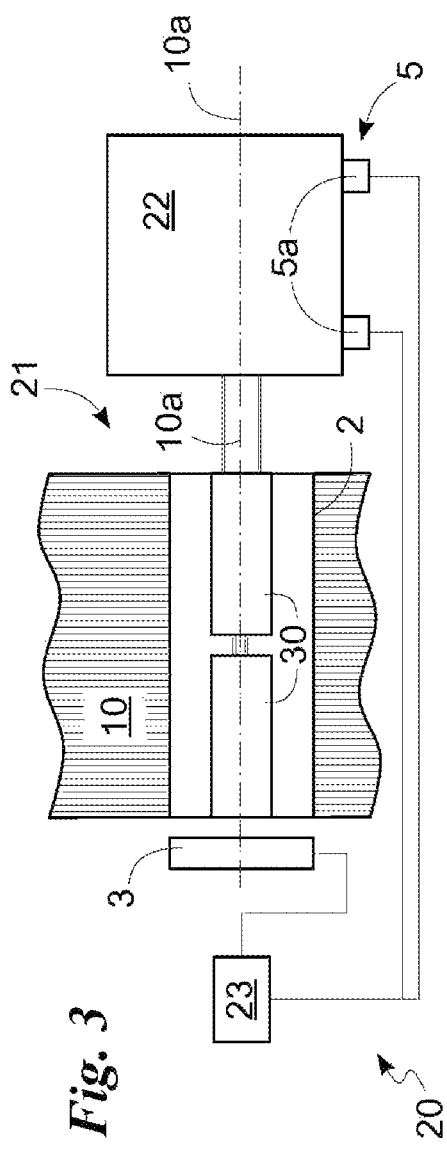
FIG. 3 shows a balancing system including the device according to the invention.

The rotating body 10 or tool is itself part of a machine tool 20 comprising a rotating portion 21, including the rotating body 10, a first fixed portion 22 and a control unit 23 (FIG. 3).

The balancing device 1 mainly comprises a rotating portion 2 suitable to be integrally connected, preferably to the inside of the rotating body 10, and to the rotating portion 21 so as to rotate around the rotation axis 10a; and a second fixed portion 3, suitable to be connected to the first fixed portion 22 adjacent to the rotating portion 2 and to be connected by a cable to a control unit 23 suitable to control the functioning of the balancing device.

In particular, the rotating portion 2 and the second fixed portion 3 are electrically connected by means of a connection without contact, in particular of the inductive type. In detail, the connection between the rotating portion 2 and the second fixed portion 3 is obtained by means of two coils 4, one connected to the rotating portion 2 and one to the second fixed portion 3 and suitable to reciprocally communicate by induction, and more specifically, by using the variation of the magnetic field in one coil 4 to create a current proportional to such variation of magnetic field in the other coil 4. An example of such wireless connection is described in patent IT-A-MI5090100 (see from page 3 row 23 to page 8 row 10 and FIGS. 1, 3 and 4) owned by the same applicant.

The balancing device 1 preferably comprises unbalance detectors 5 suitable to measure the vibrations caused by the unbalances of the rotating body 10. These preferably comprise a plurality and preferably two vibration detectors 5a. They are preferably reciprocally distanced, in particular reciprocally distanced along the rotation axis 10a, and preferably placed in correspondence with the first fixed portion 22. The vibration detectors 5a are appropriately and electrically connected to the control unit 23 by cables and the like.

The balancing device 1 preferably comprises then a plurality of and preferably two balancing heads 30, suitable to re-equilibrate the rotating body 10 depending on the unbalance measured by the unbalance detectors 5. Said heads 30 are preferably aligned along the rotation axis 10a and may be in reciprocal contact, and thus distanced by a distance defined by the outer dimensions of the heads 30, or distanced from each other.

Figure 2:
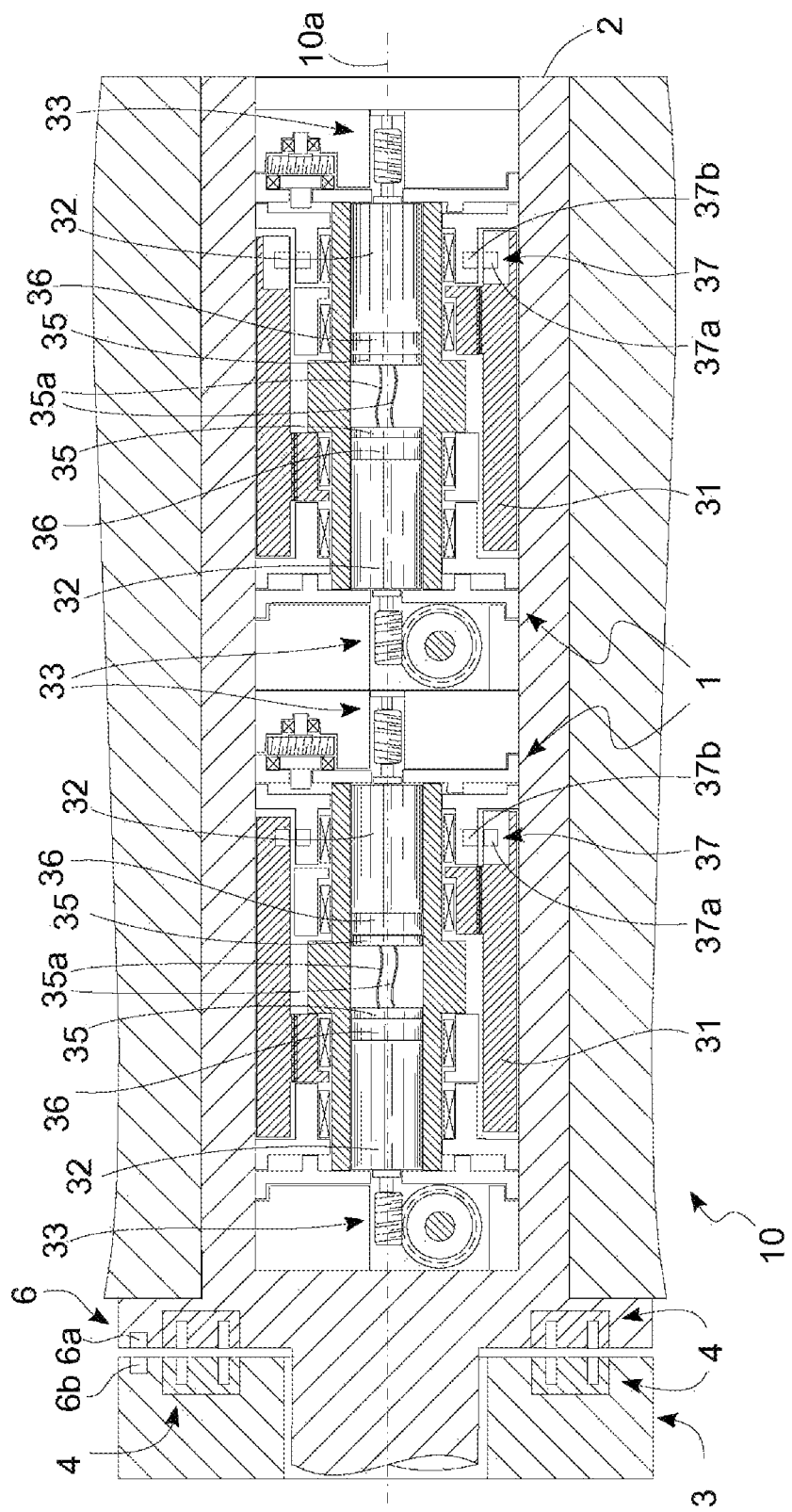
FIG. 2 shows a sagittal cross-section of a balancing device according to the invention.

In particular, in the case in which the rotating body 10 has a greater extension along the rotation axis 10a than the length of the diameter, such as in particular in grinding wheels for gears, the balancing device 1 appropriately has balancing heads 30 housed inside the rotating portion 2 (FIG. 2), integrally connected to the rotating body 10 preferably at the bases of said rotating body 10.

The unbalance detectors 5, and in particular the vibration detectors 5a may consist of any sensor, appropriately a piezoelectric sensor, suitable to measure the unbalance of the rotating body 10. Preferably, each vibration detector 5a can be identified in the sensor described in the patent EP 1645362 A (paragraphs [0031]-[0082], FIG. 1 and FIGS. 5-10) owned by the same applicant. The balancing head 30 is similar to the balancing heads described in patent EP 0409050 A (from column 3, line 34, to column 5, line 53, and FIGS. 1-3) or patent IT MI5081953 A (from page 3, line 12, to page 8, line 8, and FIGS. 1, 2a and 2b), both owned by the same applicant.

Each head 30 therefore comprises two balancing masses 31 suitable to be moved so as to cancel out the unbalance of the rotating body 10, at least one motor 32 suitable to move the balancing masses 31 independently of each other and a transmission mechanism 33 suitable to transmit the motion from the motors 32 to the balancing masses 31.

The balancing masses 31 of different balancing heads 30 are thus reciprocally distanced along the rotation axis 10a, that is to say do not have barycentres coinciding along such axis. The balancing masses 31 belonging to the same balancing heads 30 instead appropriately have the same position of the barycentre along the rotation axis 10a.

In particular, each balancing head 30 comprises two motors 32, one for each balancing mass 31, extending symmetrically along the rotation axis 10a. Appropriately, the motors 32 are electric motors, and more appropriately DC type motors.

Figure 5:
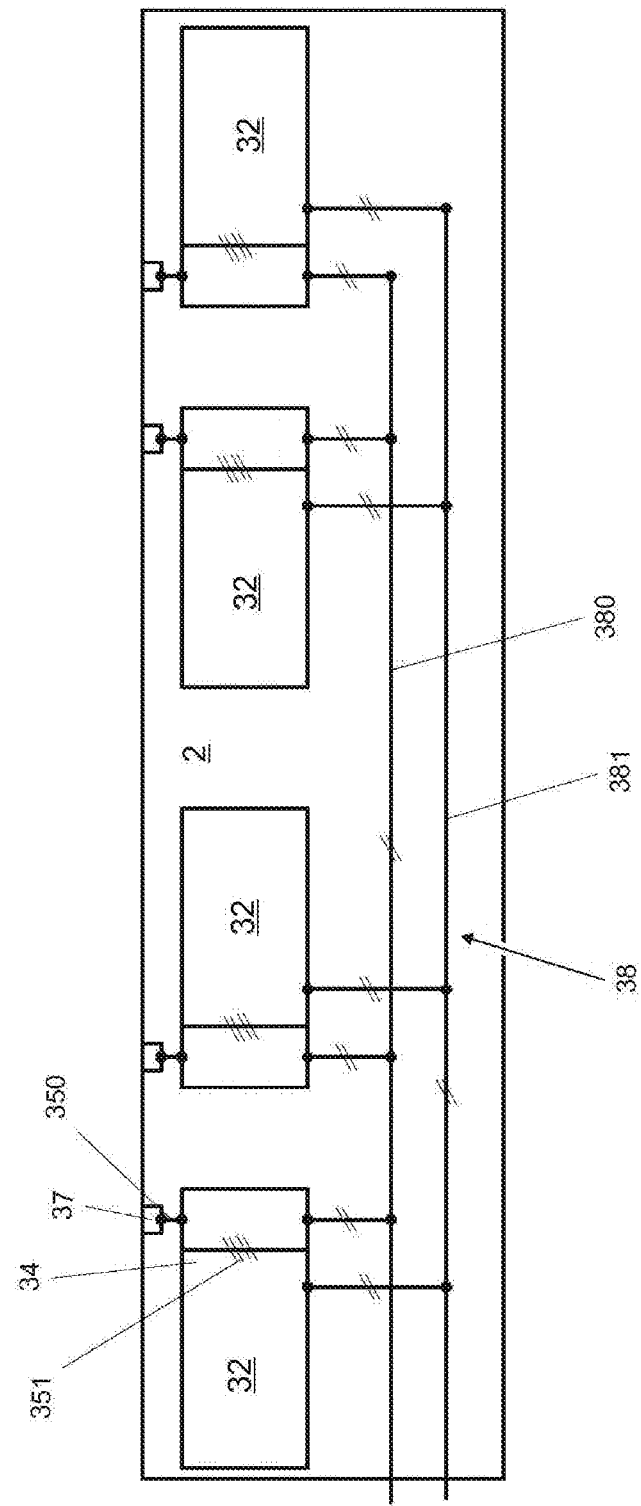
FIG. 5 shows a diagram of a portion of the device.

Moreover, the balancing device 1 comprises at least a plurality of electric lines 38 in its rotating portion 2, each composed of a plurality of electric wires to transport the various direct current or alternatively alternate current channels required (in FIG. 5 the electric wires are each symbolised by a diagonal segment). In particular, at least one electric line 38 is present, functionally associated and/or driven by each of said motors 32. The term associated is taken to mean that the electric line does not exclusively regard the motor 32 but also the strictly related elements thereof, such as the sensors described below.

In particular, at least one data line 380 and at least one power supply line 381 are present for each motor 32. The data line 380 is suitable to transmit data signals, thus generally low power signals, while the power supply line 381 is suitable to transmit the electric power for functioning of the motors 32.

Moreover, at least some of the electric lines 38 associated to a plurality of motors 32 are arranged in a network, so that a reduced quantity of electrical wires needs to be positioned inside said rotating portion 2.

The term network is taken to mean that a common line is present which is branched in correspondence with several motors 32.

A lesser or reduced quantity of electric wires, means that fewer or shorter wires are present, substantially meaning that the total mass or weight of the wires inside the rotating portion 2, is smaller.

In particular, two networks are preferably present, one for the data lines 380 and one for the power supply lines 381, alternatively only one of the two is present.

Appropriately the network or networks join all the motors present in the device 1.

The balancing masses 31 are substantially the same and preferably have a profile in the shape of an arc of circumference, substantially centred on the rotation axis 10a. They are suitable to be translated along a movement circumference substantially concentric to the rotation axis 10a and lying on a plane substantially perpendicular to the rotation axis 10a.

The transmission mechanism 33, in itself known, defines a transmission ratio among balancing masses 31 and motors 32, substantially comprised between $1/8000$ and $1/15000$ and, preferably substantially equal to $1/10000$.

Preferably, each balancing head 30 comprises, in addition to the aforesaid components, at least one position sensor 34 suitable to monitor the position of the balancing masses 31; and at least one electronic control card 35 suitable to transmit the signals coming from and preferably also reaching the motors 32 described below. The term electronic control card 35 is taken to mean an electronic circuit or other electronic means in themselves known and described further below.

The position sensor 34 is suitable to detect the absolute position of each single balancing mass 31 along the movement circumference so as to permit the motors 32 to control the reciprocal movement of the masses 31 along said circumference, as a function both of their initial position and of the unbalance of the rotating body 10, as detected by the vibration detectors 5a.

In particular, each position sensor 34 comprises a displacement sensor 36, suitable to verify the movement or shift of the masses 31. In detail, the displacement sensor 36 consists of an encoder, functionally connected to a single motor 32 and suitable to detect the actuation and the relative number of revolutions or portions of revolution, and consequent movement of the connected balancing mass 31. Said encoder is preferably of the incremental rotary type, however any kind of rotary encoder can be used, including absolute, and thus not needing the reference sensor described below, or even phonic wheel.

The precision of the displacement sensor 36 consisting of the encoder is appreciable, considering said transmission ratio between balancing masses 31 and motors 32, so that a complete revolution of a motor results in a rotation of the mass 31 by an angle, with respect to the axis 10a, of $1/10000$ of a turn, namely a few thousandths of a degree.

The position sensors 34 comprise at least one reference sensor 37, suitable to determine the position of the masses 31 with reference to the rotating portion 2, for at least one angular position. It preferably consists of a magnetic element 37a placed on each mass 31 and of a sensitive element 37b interfacing with said magnetic element 37a.

By means of the presence of the reference sensor 37 and of the displacement sensor 36, the position sensors are thus suitable to determine, at each instant, the position of the single masses 31 with reference to the rotating portion 2.

The electronic control card 35 consists of an electronic circuit. An electronic control card 35 is provided and, in particular, a control circuit, placed at, namely in contact with or next to, each motor 32 and preferably positioned at one end of said motor 32 and integral with the motor.

It receives in input, and preferably also in output, the analogue signals coming from the position sensors 34 driven by an individual motor. In particular, the electronic control card 35 communicates with the displacement sensor 36 and preferably also with the reference sensors 37.

More specifically, a first line 350 composed of several electric wires or electric connections, preferably three connections or two connections, is connected to the reference sensor 37, preferably of the magnetic type. Said connections constitute the power supply and the signals. The first line 350 is thus suitable to connect the reference sensor 37 to the control card 35 of the relative motor 32.

A second line 351 then exists which connects the displacement sensor 36, preferably an encoder, to the control circuit 35. Such second line preferably comprises a plurality of electric connections, preferably four in number. Said connections constitute the two phases of the encoder and the power supply. The encoder in fact needs separate wires for the two opposite directions of rotation.

A second power supply line may also be present for the electric motor 32, which connects the motor 32 to the electric control card 35. Alternatively, only one power supply line 381 is present connected directly to the relative network. Such line is composed of two or three electric wires or electric connections.

Consequently each single motor 32, functionally connected to a single balancing mass 31 entails the passage to the electronics of a large number of electric wires, preferably between six and twelve and more preferably nine.

The electronic control card 35 is preferably suitable to convert the received signals from analogue to digital, preferably all the signals. The digital signal thus groups the information coming from all the sensors relative to the single motor 32 or to the single mass 31 into a single encoded signal, namely the information from the position sensors 34 preferably composed of the displacement sensor 36 and also of the reference sensors 37.

The digital signal in output from the electronic control card 35 and directed to the control unit 23 is transmitted to the data line 380, preferably composed of two electric wires inside and in output from the rotation portion 2.

Moreover, appropriately, given that the rotating portion 2 comprises two or four motors 32, and consequently two or four electronic control cards 35, the same data line 380 transports the signal to and/or from all the electronic control cards 35, constituting the said network of data lines 380.

Such solution, that is the novel solution of providing the electronics of the rotating portion 2 not grouped into a single component but divided into several electronic control cards 35 each serving a motor 32, makes it possible to have two electric lines 380 and 381, appropriately composed of a total of four electric wires coming out of the balancing head 30 against the plurality of electric wires, nine for each electronic control card 35 and therefore thirty six, which would be needed in the absence of such innovation. Such plurality of wires would have caused significant assembly problems in the passage of the wires.

The electronic control card 35 is easy to make for a person skilled in the art given his general know-how.

Lastly, the balancing device 1 comprises detection means 6, suitable to measure the angular position α of the rotating body 10 with respect to the first fixed portion 22 around said rotation axis 10a, in particular during the performance of processing. Such detection means 6 comprise at least one magnet 6a, selectively connected to the rotating portion 2 or to the second fixed portion 3, and one Hall sensor 6b or other similar sensor suitable to detect said magnetic field and selectively placed in front of the magnet 6a on the second fixed portion 3 or on the rotating portion 2.

In particular, the detection means 6 comprise two magnets 6a symmetrically placed with respect to the rotation axis 10a and connected to the rotating portion 2 so as to face the second fixed portion 3 and one Hall sensor 6b connected to the second fixed portion 3 and facing the rotating portion 2.

The functioning of a balancing device for a rotating body, described above in a structural sense, is as follows.

In particular, the functioning of the balancing device 1 defines a novel balancing process for a rotating body 10.

This balancing process comprises, in brief, a start-up phase, a measurement phase, in which at least the unbalance of the rotating body 22 is measured, and a balancing phase, in which the two balancing masses 31 are moved along the movement circumference.

Initially, in the start-up phase, the device 1 measures the initial position in which the balancing masses 31 are placed inside the balancing head 30 along the circumference of movement using the sensors 34.

After defining the initial position, the start-up phase is concluded and the rotating body 10 is placed in rotation.

First of all, and periodically thereafter, a calibration phase is performed. In such calibration phase each single balancing head 30 is preferably separately activated at a different time, and in addition, combinations of balancing heads 30 may be activated together.

In particular each balancing head 30 creates an unbalance modifying, by a known measure, the position of the balancing mass 31 along the circumference of movement, while the position sensor 34 identifies the position of said masses 31. The entity and position of the unbalances is thus measured directly by means of direct measurement and the positions of the balancing masses 31 and entity thereof is measured precisely. Such measurement is preferably performed by the position sensor 34.

At the same time the unbalance detectors 5 and in particular each single vibration detector 5a, measures the vibrations caused by such unbalances and may perform a precise correlation and one-to-one correspondence between vibrations measured and entity and position of the unbalance.

It is in fact not sufficient to know the position and entity of the unbalance to precisely calculate the vibrations these cause. In fact the vibrations also depend on the mass, diameter, speed and other characteristics of the rotating portion 21 of the machine tool 20, all parameters which are not always known or known with sufficient accuracy.

Moreover, given that such parameters of the rotating portion 21 vary with the wear of the grinding wheel or other tool constituting part of the rotating portion 21, the calibration phase is periodically performed, in particular when the speed of rotation is varied following the wear of the tool.

Such measurements are appropriately memorised so that when the tool is replaced, the calibration steps need no longer be performed, since the balancing device 1 draws from the database created.

Moreover, by knowing the position of the unbalance inside the balancing head 30, thus with reference to the rotating portion 21, and by means of the detection means 6 it is possible to correlate the position of the unbalance with reference to the first fixed portion 22. In detail, during such measurement phase, the vibration detectors 5a measure the unbalance of the rotating body 21 along a predetermined angular position, one example of such measurement is given in FIG. 4, which shows the force F (F1 or F2 since preferably two vibration detectors 5a are provided) on the ordinate and the angular position $\alpha$ of the rotating body on the abscissa, while the position sensor 34 detects the position of the balancing masses 31 along the movement circumference.

Figure 4:
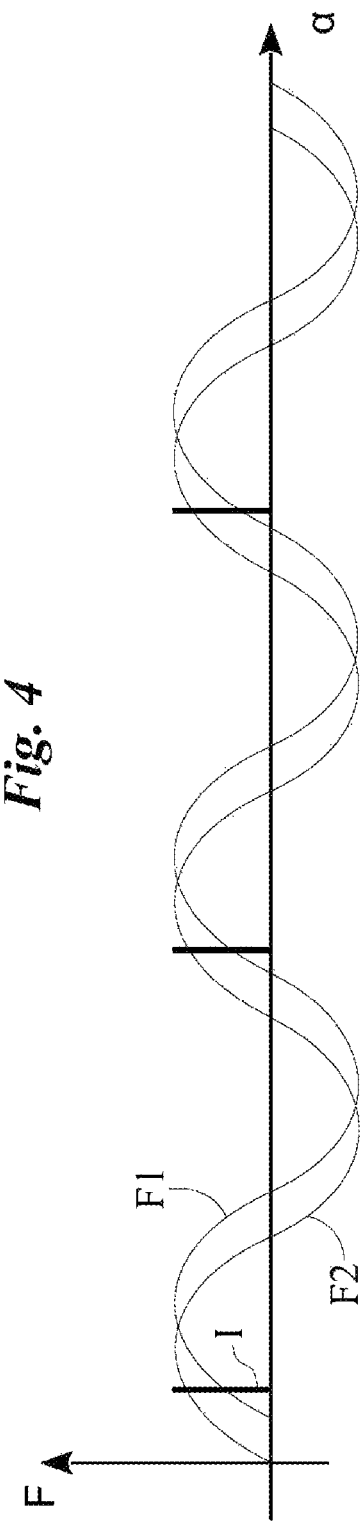
FIG. 4 shows possible measurements of the balancing device.

Furthermore, in such calibration phase, the detection means 6 measure, using the Hall effect, the angular position $\alpha$ of the rotating portion 2 with respect to the second fixed portion 3, namely the angular position of the rotating portion 21 and of the connected rotating body 10. In FIG. 4, an example is given of the measurement of the angular position $\alpha$ of the rotating body 10 in which the peaks correspond to the superimposition of the impulses I given by the magnets 6a to the Hall sensor 6b.

The absolute position, namely the position in relation to the first fixed portion 22, and the entity of the unbalance in relation to the vibrations measured by the two different vibrations detectors 5a is thus accurately correlated.

Moreover, at least two different and distant vibration detectors 5a being present, and at least two balancing heads 30 being present, the unbalances are detected and correlated to the vibrations measured along the axial and circumferential positions of the rotating portion 21 and of the connected rotating body 10.

Following the calibration phases, or even separately from the same, the unbalance measurement and balancing phases are performed.

In the measurement phase, the balancing device 1 measures the vibrations caused by the unbalance of the rotating portion 21 and of the connected rotating body 10 by the detectors 5 and in particular by the vibration detectors 5a. The vibrations measured are precisely correlated to the unbalances of the rotating portion 21, the entity and axial and circumferential position of which is accurately calculated, preferably with reference to the first fixed portion 22, thanks to the calibration phase described.

During the balancing phase the control unit 23 calculates the position of the masses 31 of the balancing heads 30 needed to cancel out the unbalances measured and preferably simultaneously controls all the said heads so that said masses 31 are consequently moved, re-balancing the unbalances in axial and circumferential directions, and thus re-balancing the dynamic and/or rotational unbalances of the rotating portion 21 and of the connected rotating body 10.

Consequently, the balancing and the movement do not occur by trial and error but directly from the initial position to the position achieving the balancing.

The invention achieves some important advantages.

In fact, the solution of arranging the data lines 380 and/or power supply lines 381 in a network makes it possible to reduce the number of electric wires present.

In addition, the novel solution of providing the electronics of the rotating portion 2 not grouped into a single component but divided into several electronic control cards 35 each serving a motor 32, makes it possible to have a data line 380, or in any case fewer electric lines inside said rotating portion 2.

A first important advantage is that the device 1 is able to balance the dynamic unbalances.

Another important advantage is that, thanks to the position sensor 34 which detects the position of the balancing masses 31 along the circumference, the balancing device 1 identifies at any time the position of the masses 31 along the circumference and is thus able to detect the displacement of the masses in order to offset the unbalance of the rotating body 10.

In fact, whereas in known devices and processes the position of the balancing masses at any time was practically unknown and therefore the balancing masses 31 had to be randomly moved, the device 1, by knowing at any time the position of the balancing masses 31, is able to easily identify how to move said masses.

Such capacity is further enhanced by the fact that, thanks to the detection means 6, the device 1 and process, by detecting the angular position α of the rotating body 10, identify the position which the balancing masses 31 must adopt in order to cancel out the unbalance.

Another advantage is that, due to the presence of the position sensor 34 and furthermore, of the detection means 6, the balancing device 1 and process cancel out the unbalance in extremely short times.

So, unlike the known devices and processes, they enable the grinding machine to achieve particularly high levels of efficiency and precision.

Another important advantage is that, thanks to a reduced transmission ratio between the motors 32 and the masses 31, the device 1 performs a particularly precise positioning of the masses 31 and is thus able to ensure an almost total cancellation of the unbalance of the rotating body 10.

Variations may be made to the invention described herein without departing from the scope of the inventive concept defined in the claims. All the elements as described and claimed herein may be replaced with equivalent elements and the details, materials, shapes and dimensions may be any within the scope of the claims.

The invention claimed is:

1. A balancing device for a rotating body, said rotating body defining a rotation axis, said balancing device, comprising:
    a rotating portion configured to be integrally connected, to the said rotating body, said rotating portion, comprising balancing masses configured to be moved relative to said rotating body along a movement circumference to cancel out said unbalances of rotating body;
    a plurality of motors one for each of said balancing masses configured to move said balancing masses;
    a plurality of electric lines, comprising electric wires and a data line, each serving one of said electric motors,
    each of said motors being associated to an electronic control card, placed at each of said motors and configured to convert analogue signals received into digital signals, and associated control electronics,
    wherein at least some of said electric lines comprising said data line associated with said plurality of motors, said electronic control card and said control electronics are arranged in a network, so that a reduced quantity of electric wires are positioned inside said rotating portion.

2. The balancing device according to claim 1, in which said electric lines comprise a power supply line.

3. The balancing device according to claim 2, in which said electric lines comprise a power supply line and a data line only.

4. The balancing device according to claim 1, wherein said electric lines associated to the totality of said motors are arranged in a network.

5. The balancing device according to claim 1, further comprising at least one position sensor configured for identifying the position of one of said balancing masses moved by one of said motors and in which said position sensor is connected to said electronic control card associated to said motor.

6. A balancing device according to claim 5, wherein said position sensor comprises a displacement sensor, configured to verify the movement or shift of said balancing mass and a reference sensor configured to determine the position of said mass with reference to the said rotating portion.

7. The balancing device according to claim 6, wherein said displacement sensor is an encoder.

* * * * *